Patented June 22, 1943

2,322,227

UNITED STATES PATENT OFFICE 2,322,227

CARBONYL COMPOUNDS OF THE CYCLOPENTANO POLYHYDRO PHENANTHRENE SERIES AND A METHOD OF PRODUCING THE SAME

Hans Dannenbaum, Falkenhain - Finkenkrug, near Berlin, Hans Herloff Inhoffen, Berlin-Wilmersdorf, and Walter Hohlweg, Hohen Neuendorf, near Berlin, Germany, assignors to Schering Corporation, Bloomfield, N. J., a corporation of New Jersey No Drawing. Application December 16, 1937, Serial No. 180,138. In Germany December 22, 1936

18 Claims. (Cl. 260—397.1)

This invention relates to carbonyl compounds of the cyclopentano polyhydro phenanthrene series, such as ketones and aldehydes or acids, in which the carbonyl group is present in the side chain of the ring system and in particular in the side chain of the five-membered ring, being adjacent a ring carbon atom and in particular the ring carbon atom in 17 position, and a method of producing the same.

The process of manufacture according to the invention consists in that compounds of the general formula:

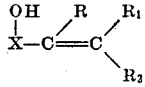

in which X indicates a cyclopentano polyhydro phenanthrene residue or ring system, R hydrogen or a hydrocarbon residue or radical, $R_1$ and $R_2$ hydrogen and/or a hydrocarbon residue or radical, such as an alkyl, aryl, aralkyl or cycloalkyl residue, are subjected to an oxidation whereby the side chain is ruptured at the double bond.

According to the type of the cyclopentano polyhydro phenanthrene derivative it may be preferable intermediately to protect double bonds present in the nucleus in a suitable manner, for example, by adding on halogen, such as bromine, or halogen hydride.

As oxidizing agents are employed the customary agents for the rupture of double bonds, as, for example, ozone, chromic acid, hydrogen peroxide, per-acids, per-salts, osmium tetroxide, vanadium compounds, such as vanadium oxide, pervanadium acid and salts thereof, lead or manganese tetracetate and others.

As starting materials can be employed any compounds of the cyclopentano polyhydro phenanthrene series which possess the above constitution, in particular such as belong to the etiocholane and alloetiocholane series and are substituted on the carbon atom 17 corresponding to the above formula, the unsaturated bond of the side chain being located between the 20-carbon and the adjacent carbon of the side chain.

Such compounds can be obtained, for example, from compounds of the cyclopentano polyhydro phenanthrene series containing keto groups, for example, from cholestanone, saturated or unsaturated androstanolones such as androsterone, dehydro-androsterone and their various isomers and also follicle hormones containing keto groups or their analogues, by means of unsaturated metal organic compounds according to specification Serial No. 109,674.

If in the above formula R is hydrogen then aldehydes, or with energetic oxidation the corresponding carboxylic acids, are immediately produced; if on the other hand R is a hydrocarbon residue or radical, ketones are obtained. Of course, the carboxylic acids can be produced by making first the aldehydes and then oxidizing the same further, for example with chromic acid.

The hydroxyl group of the ketones, aldehydes or acids obtained according to this invention, present at the ring carbon atom to which the side chain is attached can be split off in the form of water in a manner known per se, for example, by heating with acid anhydrides, high vacuum distillation and the like whereby a carbon to carbon double bond is formed which may be saturated by hydrogenation yielding ketones, aldehydes or carboxylic acids without the hydroxyl group at the ring carbon atom carrying the side chain.

The invention is illustrated by the following formulae which show the synthesis of pregnane derivatives from androstenolone:

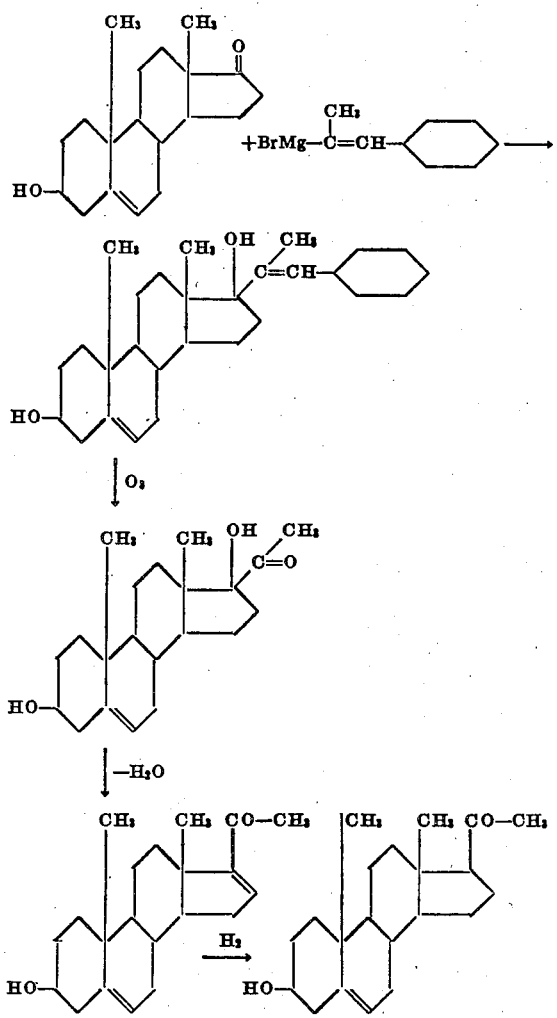

The following examples serve to illustrate the invention without, however, limiting the same to them:

*Example 1*

2 grams of completely dry cholestanone and about 5 grams of freshly distilled bromostyrene are dissolved in 50 ccs. of absolute ether and lithium metal is introduced into the solution. The reaction which soon sets in strongly is allowed to proceed with the exclusion of air and with continuous shaking until a permanent red-brown color is produced. The lithium residues are now removed, the solution is decomposed by the addition of a few ccs. of alcohol and distributed between water and ether and the ether solution evaporated. The residue is distilled with steam for 1 hour for removal of the excess of bromostyrene. The non-volatile portion is a viscous, golden-yellow resin now only containing very little halogen. It is taken up in so much glacial acetic acid that 40 ccs. of glacial acetic acid correspond to each gram of substance, and ozonised gram by gram in each case for 2 hours without cooling with ice. A test portion of the ozone solution decomposed with zinc dust and glacial acetic acid and freed from benzaldehyde by steam distillation gives strong aldehyde reaction with Schiff's reagent.

Then the main quantity is treated with so much chromic acid, dissolved in a little glacial acetic acid that 1 oxygen atom is available per styryl residue. After standing at room temperature overnight, any excess of chromic acid is destroyed with alcohol, the solution concentrated in vacuum, the residue taken up in ether and the glacial acetic acid washed out of the ether with water. By shaking with ammoniacal barium chloride solution it is easily possible to remove the hydroxy carboxylic acids of the sterol series formed in the form of their insoluble barium salts from the ether and simultaneously to separate them from the benzoic acid also formed. Neutral portions remaining in the ether can be subjected to a repeated ozonisation and so on. From the barium salts the free acids can be separated in known manner, for example, by decomposition with the calculated quantity of sulphuric acid. It is thus possible to convert the total quantity of ketone into oxy-carboxylic acids.

*Example 2*

To a Grignard solution from 18 grams of freshly distilled bromostyrene, 2 grams of Bayer-magnesium and 50 ccs. of dry ether is added 1 gram of oestrone-acetate and the mixture boiled for 6 hours under reflux. Then the Grignard solution is decomposed with aqueous amonium chloride solution and ice and the organic material taken up in ether. The residue remaining after washing and evaporation of the ether is boiled under reflux for 2 hours with 100 ccs. of 8% ethyl alcoholic caustic potash. After dilution of the alkaline solution the neutral products are removed by extracting twice with ether and the phenolic portions after acidification with dilute hydrochloric acid isolated by means of ether extraction; the yield of 17-styryl-oestradiol-3.17 amounts to 330 mg.

The oxidation is carried out in such a manner that a dilute stream of ozone is passed through a solution of 330 mg. of the said compound in 30 ccs. of chloroform for 1½ hours. Then the solvent is distilled off in vacuum at 30° C. and the ozonide after the addition of 30 ccs. of 90% acetic acid boiled for 45 minutes under reflux. After evaporation of the acetic acid in vacuum the residue is taken up in ether, the carboxylic acid produced separated by means of 5% sodium carbonate solution and after acidification again isolated with ether. The oestradiol-3.17-carboxylic acid-17 is obtained in the form of an oil; the yield amounts to 185 mg.

Of course, many changes and variations in the reaction conditions and the like may be employed by those skilled in the art in accordance with the principles set forth herein and in the claims annexed hereto.

What we claim is:

1. Process for the manufacture of carbonyl compounds of the cyclopentano polyhydrophenanthrene series, wherein compounds of the general formula

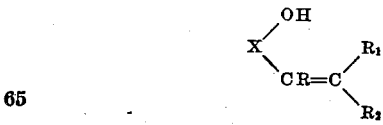

in which X indicates a cyclopentano polyhydro phenanthrene ring system, R a member of the group consisting of hydrogen and hydrocarbon radicals, R₁ and R₂ one or more members of the group consisting of hydrogen and hydrocarbon radicals, are subjected to oxidation with an agent capable of rupturing aliphatic double bonds with the addition of oxygen.

2. Process as claimed in claim 1, in which a member of the group consisting of compounds of the etiocholane and alloetiocholane series containing the cyclopentano polyhydro phenanthrene group is subjected to the oxidation.

3. Process as claimed in claim 1, in which compounds of the oestrane series are subjected to the oxidation.

4. Process as claimed in claim 1, in which a member of the group consisting of compounds of the etiocholane and alloetiocholane series containing the cyclopentano polyhydro phenanthrene group and substituted on the carbon atom 17 corresponding to the formula given in claim 1 is employed.

5. Process as claimed in claim 1, in which compounds of the oestrane series which contain the cyclopentano polyhydro phenanthrene group and are substituted on the carbon atom 17 corresponding to the formula given in claim 1 are employed.

6. Process as claimed in claim 1 in which the oxidizing agent is a member of the group consisting of ozone, chromic acid, hydrogen peroxide, per-acids, per-salts, osmium tetroxide, lead and manganese tetraacetates, vanadium oxide, pervanadium acid, and salts of pervanadium acid.

7. Process as claimed in claim 1 in which compounds of the cyclopentano polyhydro phenanthrene series containing the carbon nucleus of such series are oxidized with ozone.

8. Process for the manufacture of carbonyl compounds wherein compounds of the cyclopentano polyhydro phenanthrene series having attached to the 17 carbon atom a hydroxyl group and a group

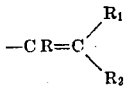

wherein R is a member of the group consisting of hydrogen and hydrocarbon radicals, and $R_1$ and $R_2$ are a member or members of the group consisting of hydrogen and hydrocarbon radicals, are subjected to oxidation with an agent capable of rupturing aliphatic double bonds with the addition of oxygen.

9. Process for the manufacture of carbonyl compounds of the cyclopentano polyhydro phenanthrene series, wherein a compound of the cyclopentano polyhydro phenanthrene series which contains the carbon nucleus of such series and is substituted by the groups

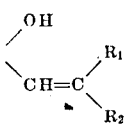

in which $R_1$ and $R_2$ are a member or members of the group consisting of hydrogen and hydrocarbon radicals, is subjected to oxidation with an agent capable of rupturing aliphatic double bonds with the addition of oxygen, and the initially formed aldehyde then oxidized further to the carboxylic acid.

10. Process for the manufacture of carbonyl compounds of the cyclopentano polyhydro phenanthrene series, wherein a compound of the cyclopentano polyhydro phenanthrene series. which contains the carbon nucleus of such series and is substituted by the group

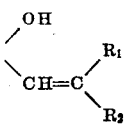

in which $R_1$ and $R_2$ are a member or members of the group consisting of hydrogen and hydrocarbon radicals, is subjected to oxidation with ozone and the initially formed aldehyde oxidized further to the carboxylic acid.

11. Process for the manufacture of carbonyl compounds of the cyclopentano polyhydro phenanthrene series, wherein a compound of the cyclopentano polyhydro phenanthrene series, which contains the carbon nucleus of such series and is substituted by the group

in which $R_1$ and $R_2$ are a member or members of the group consisting of hydrogen and hydrocarbon radicals, is subjected to oxidation with an agent capable of rupturing aliphatic double bonds with the addition of oxygen, and the initially formed aldehyde is oxidized further to the carboxylic acid with chromic acid.

12. Cholestanol-3-carboxylic-acid-3 of the formula

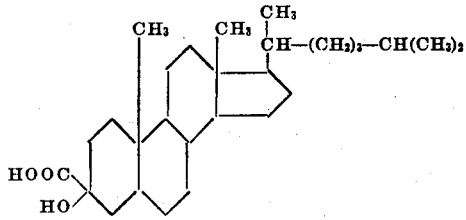

13. In a process for the conversion of dehydroandrosterone to a compound of the pregnene series, the steps which comprise treating dehydroandrosterone with a reagent capable of replacing the ketonic oxygen with the groups

wherein R is a member of the group consisting of hydrogen and hydrocarbon radicals, oxidizing the compound so obtained with an agent capable of rupturing aliphatic double bonds with the addition of oxygen, dehydrating the compound so obtained, and then hydrogenating the compound to saturate the cyclopentano ring.

14. In a process for the conversion of dehydroandrosterone into pregnenolone, the steps which comprise reacting dehydroandrosterone with a reagent capable of replacing the ketonic oxygen with the groups

wherein R is a member of the group consisting of hydrogen and hydrocarbon radicals, oxidizing the compounds so obtained with an agent capable of rupturing aliphatic double bonds with the addition of oxygen, dehydrating the compound so obtained, and then hydrogenating the compound to saturate the cyclopentano ring.

15. In a process for the conversion of an androstenone-17 into a pregnenone-17, the steps which comprise reacting an androstenone-17 compound with a reagent capable of replacing the ketonic oxygen with the groups

wherein R is a member of the group consisting of hydrogen and hydrocarbon radicals, oxidizing the compound so obtained with an agent capable of rupturing aliphatic double bonds with the addition of oxygen, dehydrating the compound so obtained, and then hydrogenating the compound to saturate the cyclopentano ring.

16. In a process for the conversion of an androstenone-17 into a pregnenone-17, the steps which comprise reacting an androstenone-17 compound with an unsaturated organo-metallic compound of the Grignard type to replace the ketonic oxygen with the group

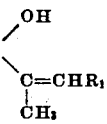

wherein $R_1$ is a hydrocarbon radical, oxidizing the compounds so obtained with an agent capable of rupturing aliphatic double bonds with the addition of oxygen, dehydrating the compound so obtained, and hydrogenating the resulting compound to saturate the cyclopentano ring.

17. A process for the manufacture of compounds of the 10,13-dimethyl-cyclopentano-polyhydro-phenenthrene series having a corbonyl-containing group in the 17-position, comprising splitting by oxidation with ozone the unsaturated linkage present in the 17 side chain of a 17-hydroxy - 10, 13- dimethyl-cyclopentano-polyhydrophenanthrene compound having attached to the 17-carbon a side chain with a double bond positioned between the 20-carbon and the adjacent carbon of the side chain.

18. A process for the manufacture of compounds of the 10,13-dimethyl-cyclopentano-polyhydro phenanthrene series, comprising splitting by oxidation the unsaturated linkage present in the 17 side chain of a 17-hydroxy-10,13-dimethyl-cyclopentano - polyhydro - phenanthrene compound having attached to the 17-carbon a side chain with a double bond between the 20-carbon and the adjacent carbon of the side chain.

HANS DANNENBAUM.
HANS HERLOFF INHOFFEN.
WALTER HOHLWEG.